United States Patent
Boissiere et al.

(10) Patent No.: US 12,142,095 B2
(45) Date of Patent: Nov. 12, 2024

(54) METHOD OF FUEL ECONOMY CALCULATION ON BRAND-NEW VEHICLES

(71) Applicant: Honda Motor Co., Ltd., Tokyo (JP)

(72) Inventors: Andrew J. Boissiere, Hilliard, OH (US); Joaquin A. Pelaez, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 118 days.

(21) Appl. No.: 17/877,583

(22) Filed: Jul. 29, 2022

(65) Prior Publication Data

US 2024/0038004 A1 Feb. 1, 2024

(51) Int. Cl.
*G07C 5/08* (2006.01)
*B60R 16/023* (2006.01)
*G06Q 30/02* (2023.01)

(52) U.S. Cl.
CPC ....... *G07C 5/0841* (2013.01); *G06Q 30/0278* (2013.01); *B60R 16/0236* (2013.01)

(58) Field of Classification Search
None
See application file for complete search history.

(56) References Cited

U.S. PATENT DOCUMENTS

| | | | | |
|---|---|---|---|---|
| 5,505,076 A * | 4/1996 | Parkman | ................. | G01F 9/008 73/114.52 |
| 6,092,021 A * | 7/2000 | Ehlbeck | .................... | G01L 3/26 701/123 |
| 6,830,121 B1 * | 12/2004 | Johnson | .............. | F02D 41/0007 180/170 |
| 6,975,217 B2 * | 12/2005 | Endoh | ..................... | G01F 9/023 701/123 |
| 7,542,833 B2 | 6/2009 | Kelly et al. | | |
| 7,617,028 B2 | 11/2009 | Kelly et al. | | |
| 7,636,623 B2 | 12/2009 | Kelly et al. | | |

(Continued)

FOREIGN PATENT DOCUMENTS

| | | |
|---|---|---|
| CN | 108986166 | 12/2018 |
| CN | 111912426 | 11/2020 |

(Continued)

*Primary Examiner* — Kevin R Steckbauer
(74) *Attorney, Agent, or Firm* — Mark E. Duell; RANKIN, HILL & CLARK LLP (57) ABSTRACT

A vehicle fuel economy system and method of operating same includes vehicle sensors for measuring fuel economy data about a vehicle. The fuel economy data includes an actual mileage and an actual fuel consumed of the vehicle. The vehicle fuel economy system includes a display device for displaying the fuel economy data, and a control device operatively connected for computer communication to the vehicle sensors and the display device. The control device, upon determining the actual mileage is below or equal to a predetermined mileage threshold, calculates an initial average fuel economy by adjusting the actual mileage by the predetermined mileage threshold. Also, the control device, upon determining the actual mileage is above the predetermined mileage threshold, calculates an average fuel economy based the actual mileage and the actual fuel consumed. The control device controls the display device to display the initial average fuel economy or the average fuel economy.

17 Claims, 4 Drawing Sheets

(56) References Cited

U.S. PATENT DOCUMENTS

| | | | |
|---|---|---|---|
| 8,538,789 B1 | 9/2013 | Blank et al. | |
| 8,928,473 B2 * | 1/2015 | Gilchrist | G07C 5/008 |
| | | | 340/425.5 |
| 9,367,972 B2 * | 6/2016 | Ulrey | G01F 9/023 |
| 9,919,664 B2 * | 3/2018 | Vucelic | B60K 35/00 |
| 10,591,341 B2 * | 3/2020 | Kobayashi | G01F 23/80 |
| 10,878,694 B2 | 12/2020 | Ebrahimian | |
| 10,885,562 B2 | 1/2021 | Cotton et al. | |
| 2003/0195676 A1 * | 10/2003 | Kelly | G07C 5/085 |
| | | | 701/123 |
| 2004/0243289 A1 | 12/2004 | Kelly et al. | |
| 2009/0150118 A1 | 6/2009 | Naima | |
| 2011/0140877 A1 * | 6/2011 | Gilchrist | G07C 5/008 |
| | | | 701/31.4 |
| 2012/0130778 A1 | 5/2012 | Cotton et al. | |
| 2013/0268315 A1 | 10/2013 | Cotton et al. | |
| 2015/0302670 A1 * | 10/2015 | Ulrey | G01F 9/023 |
| | | | 701/123 |
| 2017/0369009 A1 * | 12/2017 | Vucelic | G01F 23/00 |
| 2024/0038004 A1 * | 2/2024 | Boissiere | G06Q 30/0278 |

FOREIGN PATENT DOCUMENTS

| | | | |
|---|---|---|---|
| CN | 116061695 A | * | 5/2023 |
| IN | 220158 B | | 7/2008 |

* cited by examiner

METHOD OF FUEL ECONOMY CALCULATION ON BRAND-NEW VEHICLES

BACKGROUND

Fuel efficiency is one of the most important factors in a decision to purchase a new vehicle. On new vehicle window labels, the combined fuel economy in miles per gallon (MPG) is prominently displayed for quick and easy comparison across vehicles. When a new vehicle is driven off the lot, the label MPG does not translate accurately to the average fuel economy calculated and displayed in-vehicle. This is because the in-vehicle average fuel economy system calculates and displays the fuel economy using actual distance travelled and actual fuel volume consumed, which are improperly weighted for a new vehicle. Additionally, the in-vehicle average fuel economy for a new vehicle does not account for substantial factory and dealer vehicle idle. Thus, many drivers experience disappointment at the initial fuel mileage numbers displayed in the vehicle compared to the label MPG. A more accurate fuel economy calculation and display control for new vehicles is desirable.

BRIEF DESCRIPTION

According to one aspect, a vehicle fuel economy system includes vehicle sensors for measuring fuel economy data about a vehicle. The fuel economy data includes an actual mileage and an actual fuel consumed of the vehicle. The vehicle fuel economy system includes a display device for displaying the fuel economy data, and a control device operatively connected for computer communication to the vehicle sensors and the display device. The control device, upon determining the actual mileage is below or equal to a predetermined mileage threshold, calculates an initial average fuel economy by adjusting the actual mileage by the predetermined mileage threshold. Also, the control device, upon determining the actual mileage is above the predetermined mileage threshold, calculates an average fuel economy based the actual mileage and the actual fuel consumed. The control device controls the display device to display the initial average fuel economy or the average fuel economy.

According to another aspect, a computer-implemented method for determining vehicle fuel economy of a vehicle, may include receiving an actual mileage and an actual fuel consumed from vehicle sensors. Upon determining the actual mileage is below or equal to a predetermined mileage threshold, the method includes calculating an initial average fuel economy. Upon determining the actual mileage is above the predetermined mileage threshold, the method includes calculating an average fuel economy using the actual mileage and the actual fuel consumed. Further the method includes controlling a display device to display the initial average fuel economy or the average fuel economy by comparing the actual mileage to the predetermined mileage threshold.

According to a further aspect, a non-transitory computer-readable storage medium including instructions that when executed by a processor, causes the processor to: measure an actual mileage and an actual fuel consumed using vehicle sensors of a vehicle. Upon determining the actual mileage is below or equal to a predetermined mileage threshold, the processor calculates an initial average fuel economy by adjusting the actual mileage by the predetermined mileage threshold, and upon determining the actual mileage is above the predetermined mileage threshold, the processor calculates an average fuel economy using the actual mileage and the actual fuel consumed. Further, the processor transmits a control signal to a display device to display the initial average fuel economy or the average fuel economy by comparing the actual mileage to the predetermined mileage threshold.

BRIEF DESCRIPTION OF THE DRAWINGS

The accompanying drawings, which are incorporated in and constitute a part of the specification, illustrate various systems, methods, devices, and other embodiments of the disclosure. It will be appreciated that the illustrated element boundaries (e.g., boxes, groups of boxes, directional lines, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

As mentioned above, the average fuel economy displayed in a vehicle is typically inaccurate as compared to a projected label MPG for a new vehicle (e.g., vehicle having less than 100 miles). This is because in-vehicle average fuel consumption calculation and display does not account for the lack of data available in a new vehicle and factory and dealer vehicle idle time. Because the projected label MPG do not match the in-vehicle MPG displays for a new vehicle, customers perceive very poor fuel economy for the initial mileage of a new vehicle. Thus, fuel economy is often ranked "below expectations" by customers of new vehicles. Accordingly, the methods and systems described herein achieve improved and more accurate in-vehicle measurement and calculation of fuel economy for new vehicles. More specifically, the methods and systems described herein adjust the calculation and display of in-vehicle average fuel economy for new vehicles by using an estimated mileage and fuel consumption versus actual mileage and fuel consumption.

Figure 1:
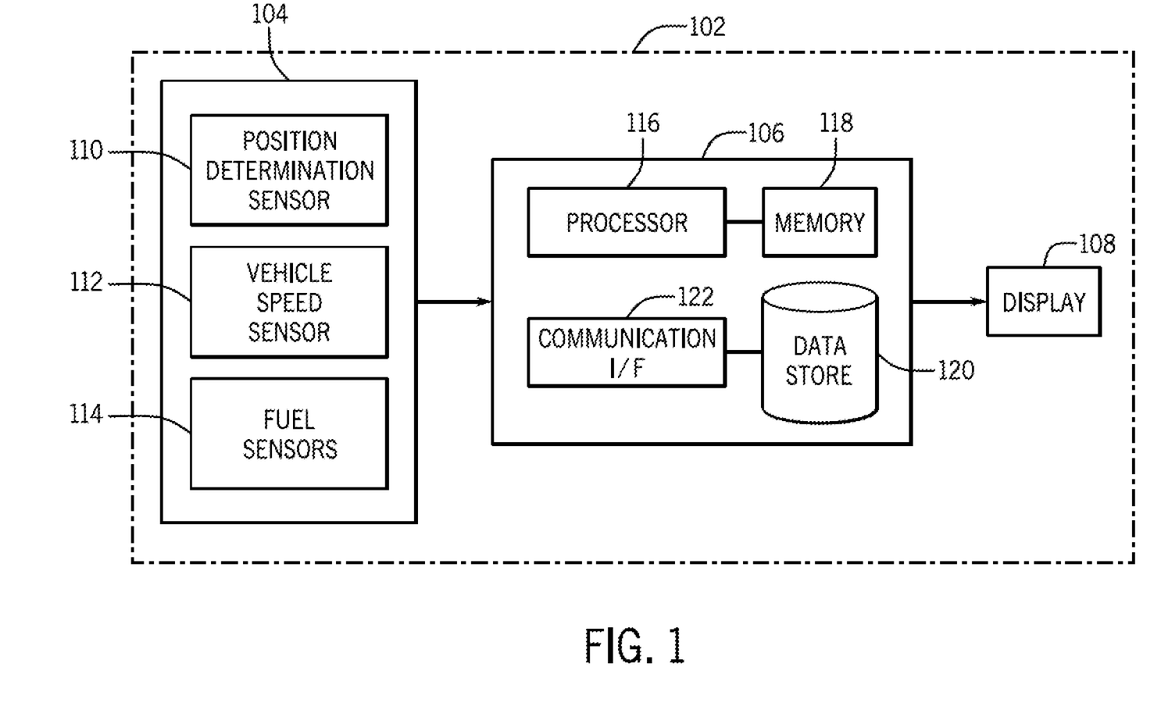
FIG. 1 is a block diagram of an exemplary vehicle implementing the vehicle fuel economy system according to an exemplary embodiment.

Referring now to the drawings, wherein the showings are for purposes of illustrating one or more exemplary embodiments and not for purposes of limiting same, FIG. 1 is a block diagram of a vehicle 102 for implementing the methods and systems described herein according to an exemplary embodiment. It is understood that the components of the vehicle 102 as well as the components of other systems, hardware architectures, and software architectures discussed herein, can be combined, omitted, or organized into different architectures for various embodiments. Also, each component of the vehicle 102 can be operably connected for computer communication via a bus (not shown) and/or other wired and wireless technologies defined herein.

The vehicle 102 includes vehicle sensors 104, a control device 106, and a display device 108. Generally, the vehicle sensors 104 sense and measure a stimulus (e.g., a signal, a property, a measurement, a quantity) associated with the vehicle 102. The vehicle sensors 104 can generate a data stream and/or a signal representing the stimulus, analyze the signal and/or transmit the signal to another component, for example the control device 106 and/or the display device 108. In the embodiment shown in FIG. 1, the vehicle sensors 104 include position determination sensors 110, vehicle speed sensors 112, and fuel sensors 114. However, it is understood that other types of sensors can be implemented.

In one embodiment, the vehicle sensors 104 are for measuring fuel economy data about the vehicle 102. The fuel economy data can include an actual mileage (mi), an actual fuel consumed (gal), and/or an average fuel economy (mpg). It is understood that the fuel economy data can be captured by one or more of the vehicle sensors 104. For example, the position determination sensors 110 can include hardware and software to determine and/or acquire position data and/or travel distance data about the vehicle 102. For example, the position determination sensors 110 can include an odometer (not shown) for measuring an actual mileage (mi) of the vehicle 102. The actual mileage is a value indicating a number of miles (e.g., 100 mi) actually travelled by the vehicle 102. The position determination sensors 110 can also include a global positioning system (GPS) unit (not shown) and/or an inertial measurement unit (IMU) (not shown). In some embodiments, the position determination sensors 110 can be part of a navigation system that provides navigation control and navigation information to the vehicle 102. For example, the position determination sensors 110 can measure and/or output a starting location, a present position, and/or a travel route along an electronic map.

The vehicle speed sensors 112 measure the speed (mph) of the vehicle 102 by monitoring the transmission/transaxle output or wheel speed of the vehicle 102. It is understood that the vehicle speed sensors 112 may measure other speed parameters such as vehicle acceleration, accelerator pedal input, accelerator pedal input pressure/rate, yaw rate, among others. The fuel sensors 114 monitor fuel parameters including, but not limited to, a fuel quantity sensor and/or a fuel flow sensor. In particular, the fuel sensors 114 can measure an actual fuel consumed (gal).

Referring again to the vehicle 102, the control device 106 can include provisions for processing, communicating, and interacting with various components of the vehicle 102. In FIG. 1, the control device 106 includes a processor 116, a memory 118, a data store 120, and a communication interface 122. In some embodiments, the control device 106 is implemented as part of an electronic control unit, an on-board unit, or as part of a specific vehicle control system, among others. The processor 116 can include logic circuitry with hardware, firmware, and software architecture frameworks for facilitating the vehicle fuel economy system and methods described herein. Thus, in some embodiments, the processor 116 can store application frameworks, kernels, libraries, drivers, application program interfaces, among others, to execute and control hardware and functions discussed herein. In some embodiments, the memory 118 and/or the data store (e.g., a disk) 120 can store similar components as the processor 116 for execution by the processor 116.

The communication interface 122 can include software and hardware to facilitate data input and output between the components of the vehicle 102. Specifically, the communication interface 122 can include network interface controllers (not shown) and other hardware and software that manages and/or monitors connections and controls bi-directional data transfer between the communication interface 122 and other components of the vehicle 102. In some embodiments, the communication interface 122 can work with the processor 116 to control output to the display device 108.

Figure 2:
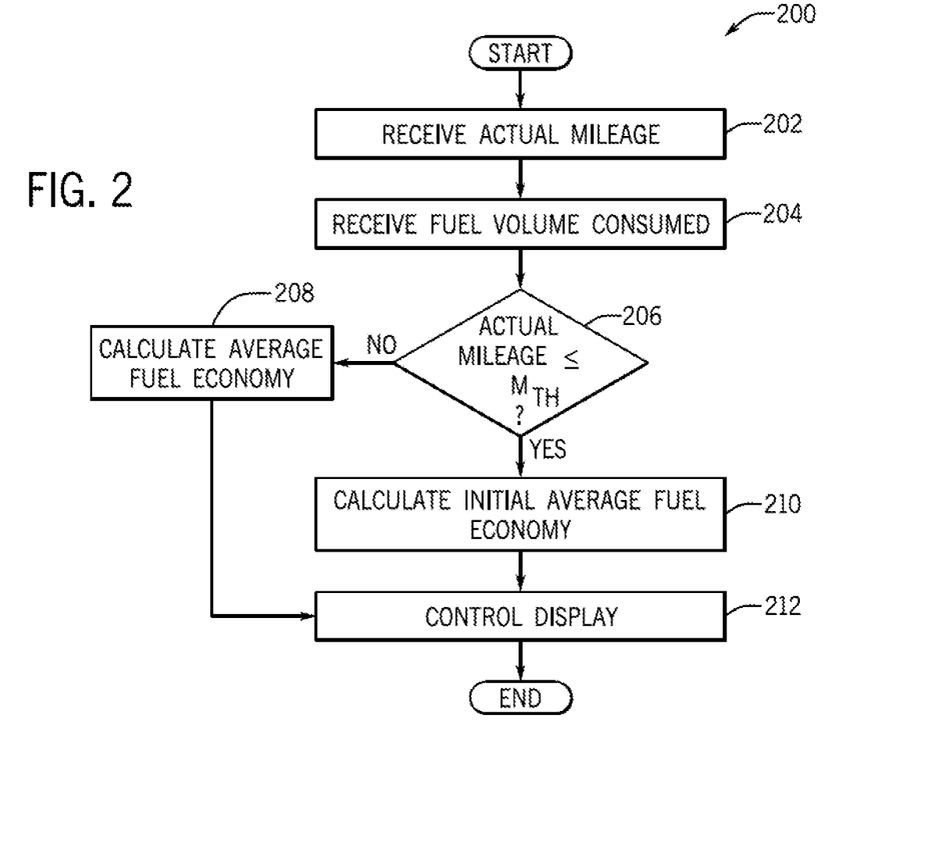
FIG. 2 is a flow chart of an exemplary method of determining vehicle fuel economy of a vehicle according to one embodiment.

The display device 108 outputs and/or displays information, indications, and/or alerts in the vehicle 102. In the embodiments discussed herein, fuel economy data can be displayed by the display device 108. The display device 108 can be located on the dashboard of the vehicle 102, for example, integrated with an instrument panel. As mentioned above, typically the control device 106 will display an average fuel economy (mpg) based on actual mileage (mi), actual fuel consumed (gal), and/or speed (mph) of the vehicle. However, this calculation for average fuel economy is not weighted properly for new vehicles. Accordingly, and with reference now to FIG. 1, a method 200 for determining vehicle fuel economy of a vehicle according to one embodiment will be discussed. At block 202 the method 200 includes receiving an actual mileage of the vehicle 102. The actual mileage is a number of miles actually travelled by the vehicle 102 and can be measured by the vehicle sensors 104, for example, an odometer (not shown) that can be part of the position determination sensors 110. At block 204, the method 200 includes receiving an actual fuel volume consumed (gal) of the vehicle. The actual fuel volume consumed of the vehicle 102 can be based on data from the vehicle speed sensors 112 and/or the fuel sensors 114.

At block 206, the method 200 includes comparing the actual mileage to a predetermined mileage threshold (i.e., $M_{TH}$). The predetermined mileage threshold is a number of miles indicating the vehicle 102 is a new vehicle. For example, the predetermined mileage threshold may be 100 miles, where when the actual mileage is less than or equal to 100 miles, the vehicle 102 is identified as a new vehicle. In some embodiments, the predetermined mileage threshold is based on local jurisdiction rules for the sale of a new car versus a used car. For example, in some jurisdictions, if a vehicle has over 200 miles, the vehicle is no longer considered a new car, and instead is categorized as a used car. It is understood that the term "predetermined mileage threshold" as used throughout this detailed description and in the claims refers to any numerical or other kind of value for distinguishing a vehicle as a new vehicle (e.g., as opposed to a used vehicle). The predetermined mileage threshold may be a discrete or continuous value or a range of values.

Referring again to block 206, upon determining the actual mileage is above the predetermined mileage threshold (i.e., not a new vehicle), the method 200 proceeds to block 208, which includes calculating an average fuel economy (mpg). Said differently, upon determining the vehicle 102 is no longer a new vehicle based on the actual mileage and the predetermined mileage threshold, the average fuel economy is calculated according to standard techniques using the actual mileage and the actual fuel consumed as shown in Equation (1) below.

$$\frac{\text{Actual Mileage (mi)}}{\text{Actual Fuel Consumed (gal)}} = \text{Average Fuel Economy } (mpg) \qquad (1)$$

Referring again to block 206, upon determining the actual mileage is below or equal to the predetermined mileage threshold (i.e., new vehicle), the method 200 proceeds to block 210, which includes calculating an initial average fuel economy. In one embodiment, the control device 106 (e.g., the processor 116) calculates the initial average fuel economy by adjusting the actual mileage by the predetermined mileage threshold. For example, the initial average fuel economy is calculated as a weighted average based on the predetermined mileage threshold. Block 210 will now be discussed in further detail with FIG. 3.

Figure 3:
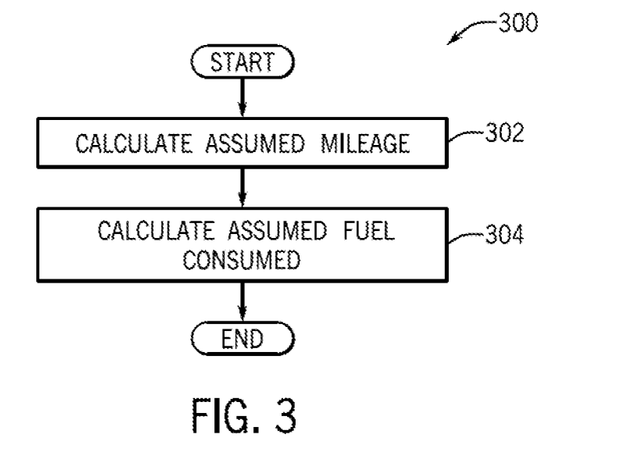
FIG. 3 is a flow chart of an exemplary method of determining an initial average fuel economy.

FIG. 3 illustrates an exemplary method 300 for determining an initial average fuel economy. At block 302, the method 300 includes calculating an assumed mileage. Block 302 is expressed mathematically as:

$$M_{TH} - \text{Actual Mileage} = \text{Assumed Mileage (mi)} \quad (2)$$

As an illustrative example, if the predetermined mileage threshold is 100 mi and the actual mileage obtained from the odometer is 75 mi, then the assumed mileage for which the initial average fuel economy is based on is 25 mi.

Referring again to FIG. 3, at block 304, the method 300 includes calculating an assumed fuel consumed using the assumed mileage calculated at block 302. This can be expressed mathematically as:

$$\text{Assumed Mileage} \times \frac{1 \text{ gal}}{23 \text{ mi}} = \text{Assumed Fuel Consumed (gal)} \quad (3)$$

The assumed mileage and the assumed fuel consumed are then utilized to calculate the initial average fuel economy (i.e., at block 210). This can be expressed mathematically as:

$$\frac{\text{Actual Mileage} - \text{Assumed Mileage}}{\text{Actual Fuel Consumed} - \text{Assumed Fuel Consumed}} \quad (4)$$

where the assumed mileage is subtracted from the actual mileage and divided by the subtraction of the assumed fuel consumed from the actual fuel consumed.

Referring back to FIG. 2, at block 212, the method 200 includes controlling the display device 108 to display the initial average fuel economy or the average fuel economy. For example, the control device 106 can transmit a control signal (not shown) to the display device 108 to display the initial average fuel economy or the average fuel economy. In some embodiments, control of the display device 108 is based on comparing the actual mileage to the predetermined mileage threshold. Thus, the control device 106 implements selective control of which fuel economy data is displayed on the display device 108. More specifically, upon determining the actual mileage is below or equal to the predetermined mileage threshold (i.e., new vehicle), the control device 106 transmits the initial average fuel economy to the display device 108 and controls the display device 108 to display the initial average fuel economy. Further, upon determining the actual mileage is above the predetermined mileage threshold (i.e., not a new vehicle), the control device 106 controls the display device 108 to display the average fuel economy.

Figure 4A:
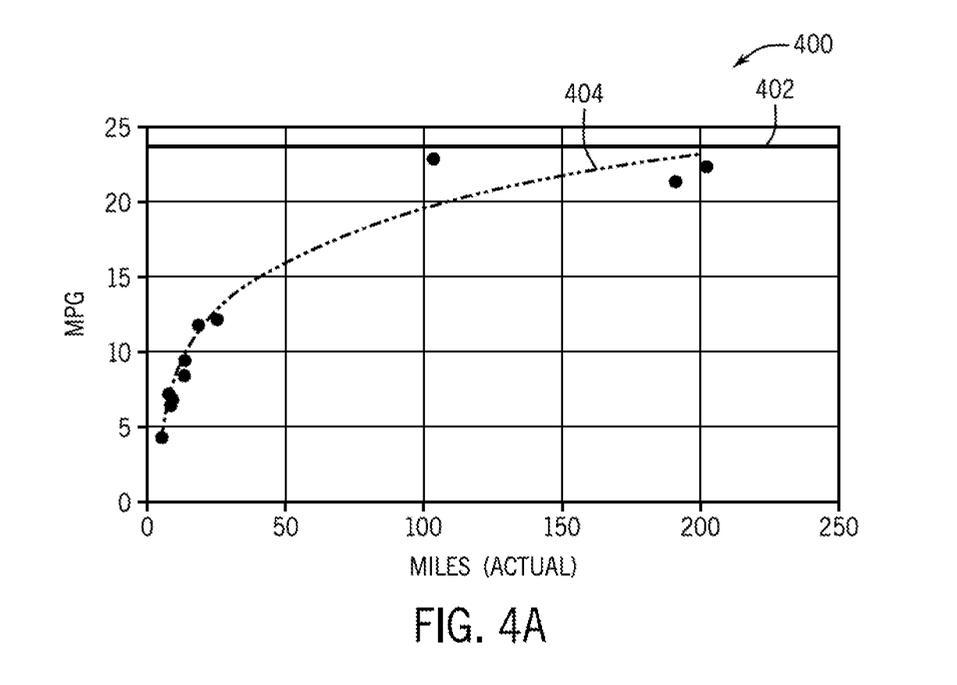
FIG. 4A is graph illustrating results of conventional methods of determining an average fuel economy.
Figure 4B:
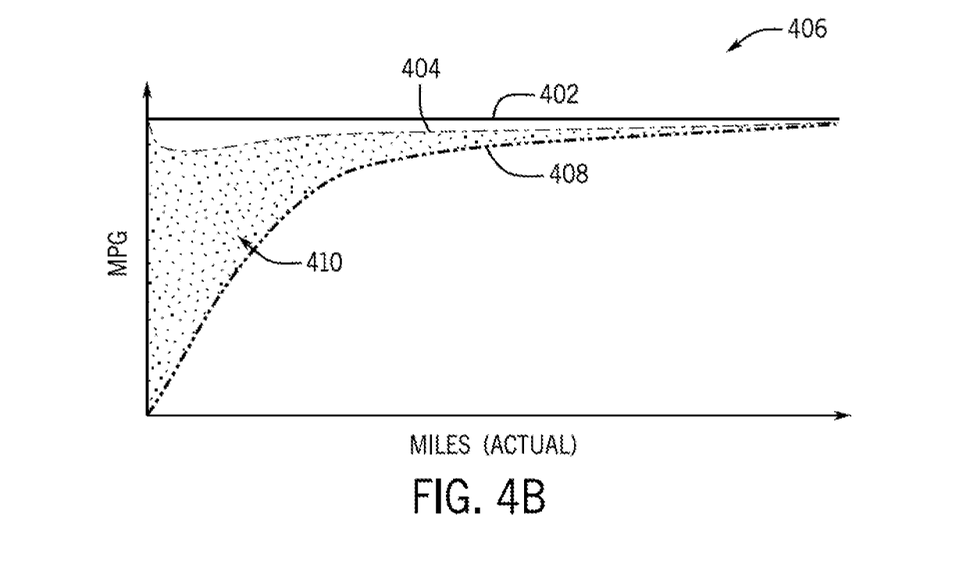
FIG. 4B is a graph illustrating results of an exemplary method of determining an initial average fuel economy.
Figure 5:
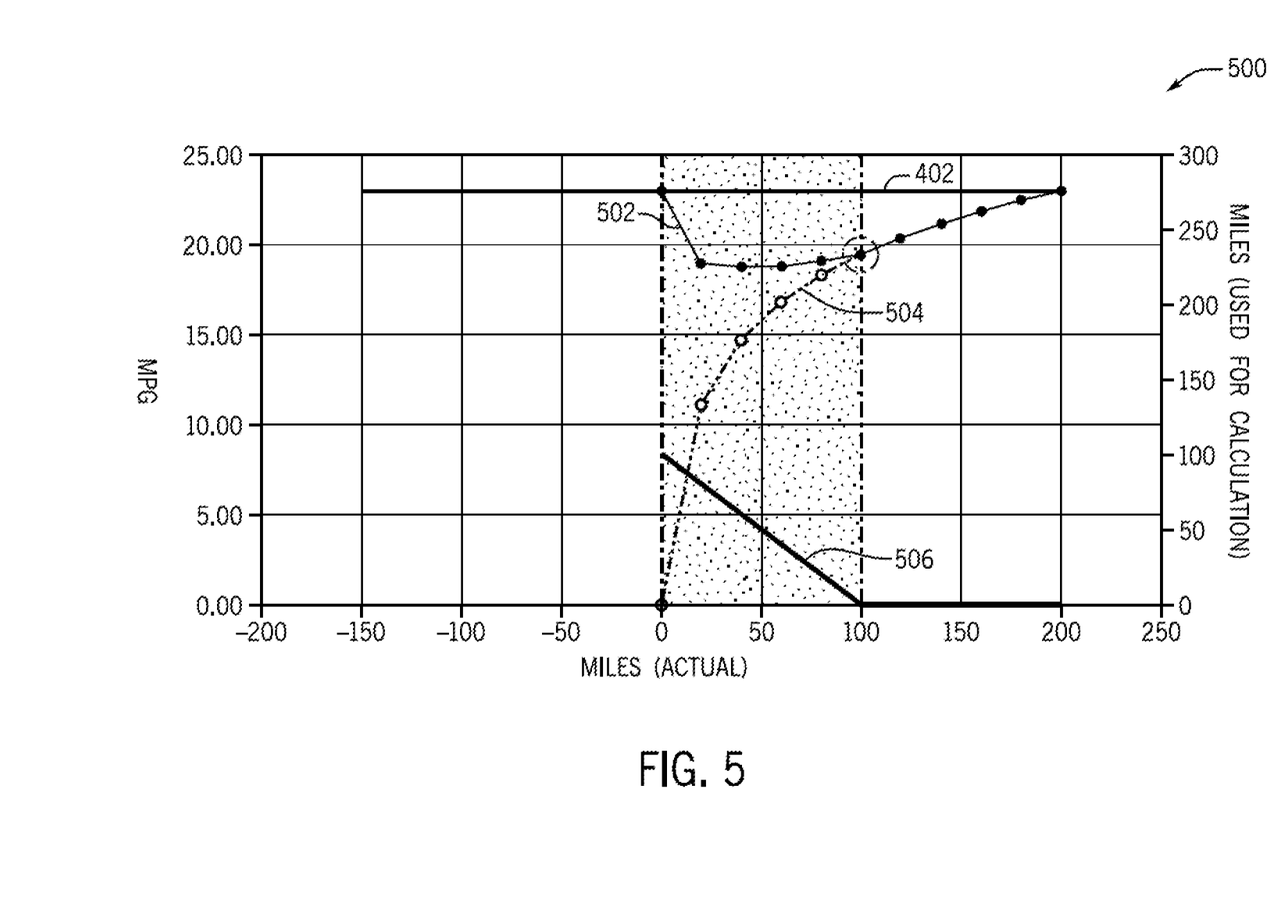
FIG. 5 is a graph illustrating values used in the initial average fuel economy calculation and display according to one embodiment.

Referring now to FIGS. 4A, 4B, and 5, the advantages of the systems and methods described herein compared to conventional techniques can be seen. FIG. 4A illustrates a graph 400. The line 402 represents a label fuel economy (i.e., projected mpg on a vehicle sticker) of 25 mph. The line 404 represents average fuel economy based on actual miles. The customer (e.g., driver) perceives very poor fuel economy for approximately the first 100 to 200 miles. This is because the average fuel economy does not consider factory and dealer vehicle idle time. In contrast, FIG. 4B illustrates a graph 406 where a line 408 illustrates an initial fuel economy as determined according to the methods and systems described herein. The shaded area 410 represents the customer's perceived lost fuel economy.

FIG. 5 is a graph 500 showing values of the the initial fuel economy calculation. The line 502 represents the initial average fuel economy (e.g., corrected average fuel economy), the line 504 represents actual mpg of the vehicle, the line 506 represents the number of assumed miles used to calculate the initial average fuel economy. As can be seen from the graph 500, the assumed mileage is calculated when the actual mileage (e.g., from the odometer) is between 0 mi and 100 mi. The initial average fuel economy 502 is much closer to the label fuel economy 402 than the actual mpg 504. Accordingly, the initial average fuel economy methods and systems discussed herein are more accurate and realistic for brand new vehicles than typical average fuel economy systems.

The following includes definitions of selected terms employed herein. The definitions include various examples and/or forms of components that fall within the scope of a term and that may be used for implementation. The examples are not intended to be limiting. Further, the components discussed herein, may be combined, omitted or organized with other components or into different architectures.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more computing devices (e.g., computer, personal digital assistant, cellular telephone, network device, vehicle, vehicle computing device, infrastructure device, roadside device) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. A database may be stored, for example, at a disk and/or a memory.

"Disk," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Operable connection," or a connection by which entities are "operably connected," is one in which signals, physical communications, and/or logical communications may be sent and/or received. An operable connection may include a wireless interface, a physical interface, a data interface, and/or an electrical interface.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more human occupants. Further, the term "vehicle" may include vehicles that are automated or non-automated with pre-determined paths or free-moving vehicles.

The embodiments discussed herein can also be described and implemented in the context of "computer-readable medium" or "computer storage medium." As used herein, "computer-readable medium" or "computer storage medium refers to a non-transitory medium that stores instructions, algorithms, and/or data configured to perform one or more of the disclosed functions when executed. Computer-readable medium can be non-volatile, volatile, removable, and non-removable, media implemented in any method or technology for storage of information such as computer readable instructions, data structures, modules or other data. Computer-readable medium can include, but is not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can interface with. Computer-readable medium excludes non-transitory tangible media and propagated data signals.

It will be appreciated that various embodiments of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A vehicle fuel economy system, comprising:
   vehicle sensors for measuring fuel economy data about a vehicle, wherein the fuel economy data includes an actual mileage and an actual fuel consumed of the vehicle;
   a screen display device for displaying the fuel economy data; and
   a control device operatively connected for computer communication to the vehicle sensors and the screen display device, the control device including a processor, a memory, a data store, and a communication interface, wherein the control device is configured to:
   upon determining the actual mileage is below or equal to a predetermined mileage threshold, calculate an initial average fuel economy based upon the predetermined mileage threshold and calculate an assumed mileage based on the predetermined mileage threshold and the actual mileage and an assumed fuel consumed based on the assumed mileage;
   upon determining the actual mileage is above the predetermined mileage threshold, calculate an average fuel economy based the actual mileage and the actual fuel consumed; and
   control the screen display device to display the initial average fuel economy or the average fuel economy.

2. The vehicle fuel economy system of claim 1, wherein the predetermined mileage threshold is a number of miles indicating the vehicle is a new vehicle.

3. The vehicle fuel economy system of claim 1, wherein the predetermined mileage threshold is 100 miles.

4. The vehicle fuel economy system of claim 1, wherein the vehicle sensors include an odometer for measuring the actual mileage.

5. The vehicle fuel economy system of claim 1, wherein the vehicle sensors include fuel sensors for measuring the actual fuel consumed.

6. The vehicle fuel economy system of claim 1, wherein the control device calculates the initial average fuel economy based on the assumed mileage and the assumed fuel consumed.

7. The vehicle fuel economy system of claim 6, wherein upon determining the actual mileage is below or equal to the predetermined mileage threshold, the control device transmits the initial average fuel economy to the screen display device and controls the screen display device to display the initial average fuel economy.

8. The vehicle fuel economy system of claim 1, wherein upon determining the actual mileage is below or equal to the predetermined mileage threshold, the control device controls the screen display device to display the initial average fuel economy, and upon determining the actual mileage is above the predetermined mileage threshold, the control device controls the screen display device to display the average fuel economy.

9. A computer-implemented method for determining vehicle fuel economy of a vehicle, comprising:
   receiving an actual mileage and an actual fuel consumed from vehicle sensors;
   upon determining the actual mileage is below or equal to a predetermined mileage threshold, calculating an initial average fuel economy based upon the predetermined mileage threshold and calculating an assumed mileage based on the predetermined mileage threshold and the actual mileage and an assumed fuel consumed based on the assumed mileage;
   upon determining the actual mileage is above the predetermined mileage threshold, calculating an average fuel economy using the actual mileage and the actual fuel consumed; and
   controlling a screen display device to display the initial average fuel economy or the average fuel economy by comparing the actual mileage to the predetermined mileage threshold.

10. The computer-implemented method of claim 9, wherein the predetermined threshold is a number of miles indicating the vehicle is a new vehicle.

11. The computer-implemented method of claim 9, wherein calculating the initial average fuel economy further includes calculating the initial average fuel economy using the assumed mileage and the assumed fuel consumed.

12. The computer-implemented method of claim 9, wherein controlling the screen display device further includes controlling the screen display device to display the initial average fuel economy when the actual mileage is below or equal to the predetermined mileage threshold, and controlling the screen display device to display the average fuel economy when the actual mileage is above the predetermine threshold.

13. A non-transitory computer-readable storage medium including instructions that when executed by a processor, causes the processor to:
   measure an actual mileage and an actual fuel consumed using vehicle sensors of a vehicle;
   upon determining the actual mileage is below or equal to a predetermined mileage threshold, calculate an initial average fuel economy based upon the predetermined mileage threshold and calculate an assumed mileage based on the predetermined mileage threshold and the actual mileage and an assumed fuel consumed based on the assumed mileage;
   upon determining the actual mileage is above the predetermined mileage threshold, calculate an average fuel economy using the actual mileage and the actual fuel consumed; and
   transmit a control signal to a screen display device to display the initial average fuel economy or the average fuel economy by comparing the actual mileage to the predetermined mileage threshold.

14. The non-transitory computer-readable storage medium of claim 13, wherein the predetermined mileage threshold is a number of miles indicating the vehicle is a new vehicle.

15. The non-transitory computer-readable storage medium of claim 13, wherein the predetermined mileage threshold is 100 miles.

16. The non-transitory computer-readable storage medium of claim 13, further causing the processor to calculate the initial average fuel economy using the assumed mileage and the assumed fuel consumed.

17. The non-transitory computer-readable storage medium of claim 13, further causing the processor to transmit the control signal to the screen display device to display the initial average fuel economy when the actual mileage is below or equal to the predetermined mileage threshold, and causing the processor to transmit the control signal to the screen display device to display the average fuel economy when the actual mileage is above the predetermine threshold.

* * * * *